US011055385B2

(12) United States Patent
Saboori et al.

(10) Patent No.: US 11,055,385 B2
(45) Date of Patent: *Jul. 6, 2021

(54) MULTI-FACTOR USER AUTHENTICATION FRAMEWORK USING ASYMMETRIC KEY

(71) Applicant: Microsoft Technology Licensing, LLC, Redmond, WA (US)

(72) Inventors: Anooshiravan Saboori, Seattle, WA (US); Nelly Porter, Kirkland, WA (US); Vijay G. Bharadwaj, Sammamish, WA (US); Alexander Thomas Weinert, Seattle, WA (US); Octavian T. Ureche, Bellevue, WA (US); Benjamin Richard Vincent, Kirkland, WA (US); Tarek Bahaa El-Din Mahmoud Kamel, Issaquah, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/368,619

(22) Filed: Mar. 28, 2019

(65) Prior Publication Data
US 2019/0220579 A1 Jul. 18, 2019

Related U.S. Application Data (63) Continuation of application No. 15/943,340, filed on Apr. 2, 2018, now Pat. No. 10,268,809, which is a (Continued)

(51) Int. Cl.
*G06F 21/31* (2013.01)
*G06F 21/33* (2013.01)
(Continued)

(52) U.S. Cl.
CPC .............. *G06F 21/31* (2013.01); *G06F 21/33* (2013.01); *G06F 21/35* (2013.01); *H04L 63/06* (2013.01);
(Continued)

(58) Field of Classification Search
CPC ................................. G06F 21/31; G06F 21/33
(Continued)

(56) References Cited

U.S. PATENT DOCUMENTS 5,229,764 A * 7/1993 Matchett ............ G07C 9/00158
340/5.52
2006/0198517 A1* 9/2006 Cameron .............. G06F 21/445
380/44
(Continued)

FOREIGN PATENT DOCUMENTS

| CN | 103414746 A | 11/2013 |
|---|---|---|
| CN | 104915832 A | 9/2015 |

OTHER PUBLICATIONS

"Office Action Issued in European Patent Application No. 16779308. 2", dated Apr. 30, 2020, 6 Pages.
(Continued)

*Primary Examiner* — Dant B Shaifer Harriman
(74) *Attorney, Agent, or Firm* — Fiala & Weaver P.L.L.C.

(57) ABSTRACT

A multi-factor user authentication framework using asymmetric key includes a host device, a user agent, a gesture system, and an authentication system. The multiple factors include a user credential as well as a user gesture that indicates that the user is present. The user interacts with the user agent via the host device in order to obtain access to something for which user authentication is needed. The authentication system maintains the user credentials, which are provided to authenticate the user in response to the authentication system determining that the user is present (Continued)

(which can be determined in different manners, such as using a personal identification number (PIN), biometric information regarding the user, geographic location of the gesture system, etc.). The user agent, gesture system, and authentication system can be implemented on the same device (e.g., the host device), or alternatively implemented across one or more different devices.

21 Claims, 5 Drawing Sheets

Related U.S. Application Data continuation of application No. 14/883,511, filed on Oct. 14, 2015, now Pat. No. 9,967,244.

(51) Int. Cl.
    *G06F 21/35*     (2013.01)
    *H04L 29/06*     (2006.01)
    *H04W 12/63*     (2021.01)
    *H04W 12/68*     (2021.01)

(52) U.S. Cl.
    CPC ...... *H04L 63/08* (2013.01); *G06F 2221/2111* (2013.01); *H04L 2463/082* (2013.01); *H04W 12/63* (2021.01); *H04W 12/68* (2021.01)

(58) Field of Classification Search
    USPC .......................................................... 726/7
    See application file for complete search history.

(56) References Cited

U.S. PATENT DOCUMENTS

| | | | | |
|---|---|---|---|---|
| 2011/0173204 A1* | 7/2011 | Murillo | ................... | G06F 3/017 |
| | | | | 707/741 |
| 2011/0209214 A1* | 8/2011 | Simske | ................... | G06F 21/32 |
| | | | | 726/21 |
| 2014/0143856 A1* | 5/2014 | Wu | ........................ | G06F 21/31 |
| | | | | 726/16 |

OTHER PUBLICATIONS

"First Office Action and Search Report Issued in Chinese Patent Application No. 201680060395.1", dated Feb. 24, 2021, 15 Pages.

* cited by examiner

MULTI-FACTOR USER AUTHENTICATION FRAMEWORK USING ASYMMETRIC KEY

RELATED APPLICATIONS

This application is a continuation of allowed U.S. patent application Ser. No. 15/943,340, filed Apr. 2, 2018, entitled "Multi-Factor User Authentication Framework Using Asymmetric Key," the disclosure of which is hereby incorporated by reference in its entirety. U.S. patent application Ser. No. 15/943,340 claims priority to U.S. patent application Ser. No. 14/883,511, filed Oct. 14, 2015, entitled "Multi-Factor User Authentication Framework Using Asymmetric Key," the entire disclosure of which is hereby incorporated by reference.

BACKGROUND

As computing technology has advanced, computers have become increasingly commonplace and used in a variety of different manners. For example, users run applications and access services via the Internet from their mobile phones, desktop computers, laptop computers, and so forth. Applications and services oftentimes desire to have the user authenticated, so that the application or service knows that the user is in fact the person he or she claims to be. Providing such authentication, however, remains a difficult problem for computing device developers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an authentication system includes a gesture verification system and a digital signature generator. The gesture verification system is configured to receive a gesture detected by a gesture system, the gesture indicating that a user is present at a host device, and to verify the gesture. The digital signature generator is configured to generate, in response to the gesture being verified, proof of knowledge of a private key of a public/private key pair, the proof of knowledge of the private key comprising a statement digitally signed using the private key, the digitally signed statement indicating both that the authentication system has knowledge of the private key and that the gesture has been verified by the authentication system, and communicate the proof of knowledge to a user agent of the host device.

In accordance with one or more aspects, a computing device includes one or more processors and one or more computer-readable storage devices having stored thereon instructions. The instructions cause the one or more processors to receive, from an authentication system, both proof of knowledge of a private key of a public/private key pair and an indication that a gesture of a user detected by a gesture system has been verified by the authentication system, the gesture indicating that the user is present at the computing device and the proof of knowledge comprising a statement digitally signed using the private key, and provide an authentication result of the user to a requester of the authentication result based at least on the proof of knowledge and the indication.

In accordance with one or more aspects, in a computing device both proof of knowledge of a private key of a public/private key pair and an indication that a gesture of a user detected by a gesture system has been verified by the authentication system are received from an authentication system. The gesture indicates that the user is present at the computing device and the proof of knowledge comprises a statement digitally signed using the private key. An authentication result of the user is provided to a requester of the authentication result based at least on the proof of knowledge and the indication In accordance with one or more aspects, an authentication system includes a gesture verification system and a digital signature generator. The gesture verification system is configured to receive a gesture of a user detected by a gesture system, the gesture indicating that the user is present at a computing device, and to verify the gesture. The digital signature generator is configured to generate both proof of knowledge of a private key of a public/private key pair and an indication that the gesture detected by the gesture system has been verified by the authentication system, the proof of knowledge comprising a statement digitally signed using the private key, and to provide to the computing device both the proof of knowledge of the private key and the indication that the gesture detected by the gesture system has been verified by the authentication system.

In accordance with one or more aspects, in an authentication system a gesture of a user detected by a gesture system is received, the gesture indicating that the user is present at a computing device. The gesture is verified, and both proof of knowledge of a private key of a public/private key pair and an indication that the gesture detected by the gesture system has been verified by the authentication system is generated, the proof of knowledge comprising a statement digitally signed using the private key. Both the proof of knowledge of the private key and the indication that the gesture detected by the gesture system has been verified by the authentication system are provided to the computing device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

A multi-factor user authentication framework using asymmetric key is discussed herein. The framework includes a host device, a user agent, a gesture system, and an authentication system. The multiple factors include a user credential, which includes the asymmetric key, as well as a user gesture that indicates that the user is present (e.g., at the host device or other device implementing the gesture system). The user interacts with the user agent in order to obtain access to something for which user authentication is needed, such as a remote service, a program, a device, and so forth. The authentication system maintains the user credentials, which are provided to authenticate the user in response to the gesture system determining that the user is present. The gesture system can determine that the user is present in various different manners, such as based on user entry of a personal identification number (PIN), biometric information regarding the user, geographic location of the gesture system, and so forth. The user agent, gesture system, and authentication system can be implemented on the same device (e.g., the host device), or alternatively implemented across one or more different devices.

The techniques discussed herein provide a framework for multi-factor user authentication. Various programs, services, devices, and so forth can leverage the framework discussed herein, increasing security of such programs, services, devices, and so forth by authenticating the user. For example, the framework discussed herein can be used to logon to a computing device (e.g., the host device), to access a remote service over the Internet (e.g., a user's bank, a merchant), to run a program on a computing device after the user has logged onto the computing device, and so forth. By using the same framework, the user experience remains consistent across these different uses of the same framework, improving usability of devices implementing the framework by allowing the user to be presented with a consistent user experience rather than having to learn and interact with multiple different user experiences.

Furthermore, the techniques discussed herein provide an extensible framework, allowing different devices implementing gesture systems, authentication systems, and/or user agents to be used. For example, the user agent and authentication system are not tied to any particular type of gesture device implementing a gesture system, and can be readily adapted to use any type of gesture device.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair (also referred to as asymmetric keys). The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

Figure 1:
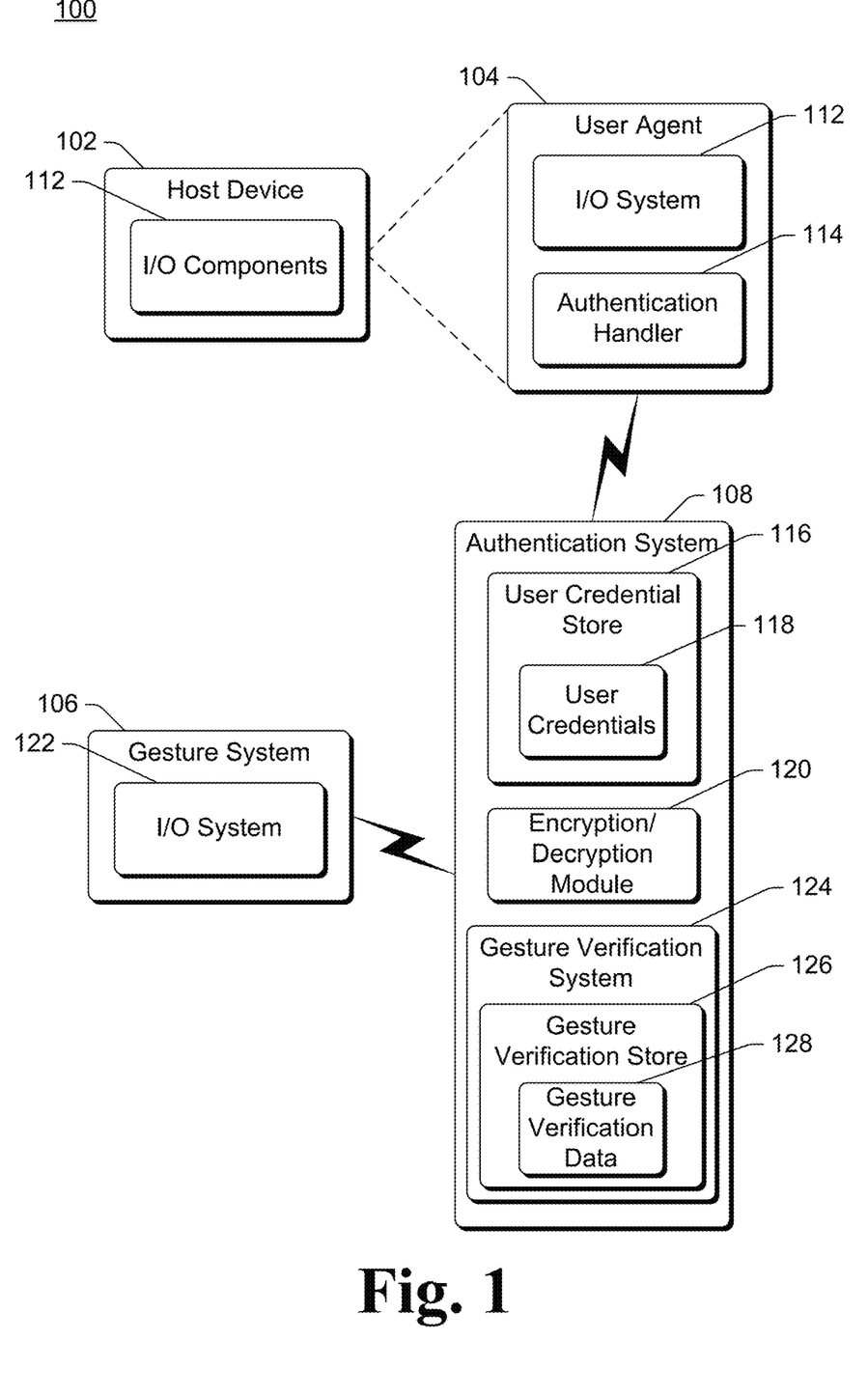
FIG. 1 illustrates an example system implementing the multi-factor user authentication framework using asymmetric key in accordance with one or more embodiments.

FIG. 1 illustrates an example system 100 implementing the multi-factor user authentication framework using asymmetric key in accordance with one or more embodiments. The system 100 includes a host device 102, a user agent 104, a gesture system 106, and an authentication system 108. Generally, the user agent 104 allows a user to use the host device 102 to interact with the system 100, for example requesting access to a service, program, device, etc. to which the user desires access. The user agent 104 can be a program running on the host device 102, or alternatively accessed by the host device 102 (e.g., the user agent 104 can be a web application running in the cloud and accessed via the Internet). The authentication system 108 maintains user credentials that are one factor in the multi-factor authentication of the user of the system 100 (e.g., the user that is present at the host device 102 or another device implementing the gesture system). The gesture system 106 determines whether a particular user is present at the system 100 by obtaining information (also referred to herein as a gesture) from the user, such as by receiving a PIN or biometric information from the user. The gesture is another factor in the multi-factor authentication of the user of the system 100. The authentication of a particular user is successful only if that particular user is determined to be present at the system 100 and the user credentials from the authentication system 108 are verified, as discussed in more detail below.

The user agent 104, the gesture system 106, and the authentication system 108 can be implemented on the same computing device (e.g., the host device 102), or alternatively on one or more different computing devices. When implemented on different computing devices, different ones of the user agent 104, the gesture system 106, and the authentication system 108 can communicate with one another via any of a variety of different types of communication mechanisms. For example, such communication can occur via a wired or wireless connection, such as a USB (universal serial bus) connection, a wireless USB connection, an infrared connection, a Bluetooth connection, a Bluetooth low energy (BLE) connection, a Near field communication (NFC) connection, a DisplayPort connection, a PCI (a peripheral component interconnect) Express connection, and so forth. The communication can alternatively or additionally occur via a data network, such as the Internet, a local area network (LAN), a phone network, an intranet, a personal area network (PAN), other public and/or proprietary networks, combinations thereof, and so forth.

Each computing device used to implement any combination of the host device 102, the user agent 104, the gesture system 106, and the authentication system 108 can be any of a variety of different types of computing devices. For example, such a computing device can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), an Internet of Things (IoT) device (e.g., objects or things with software, firmware, and/or hardware to allow communication with other devices), a television or other display device, an automotive computer, and so forth.

Figure 2:
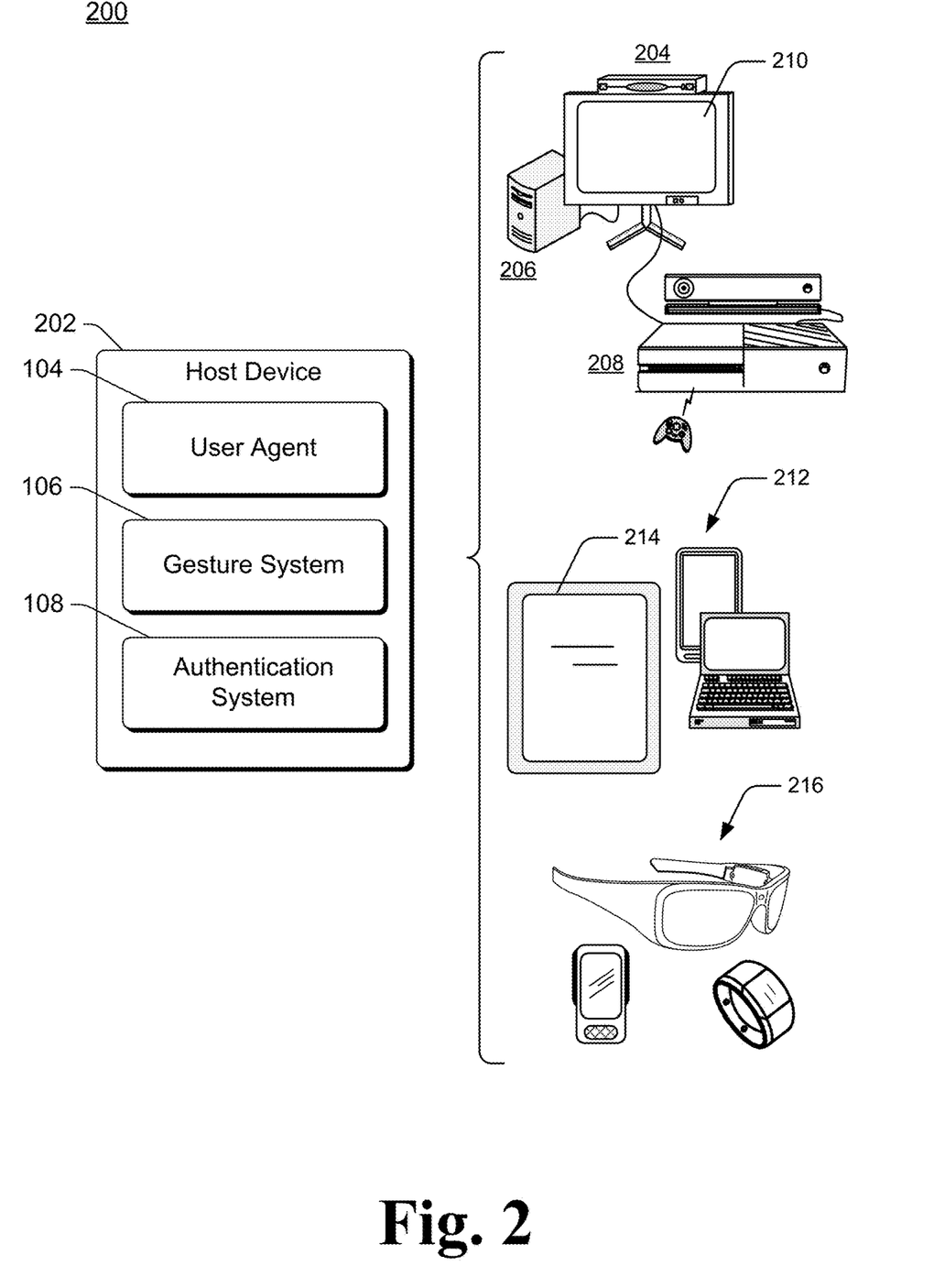
FIG. 2 illustrates another example system implementing the multi-factor user authentication framework using asymmetric key in accordance with one or more embodiments.

FIG. 2 illustrates another example system 200 implementing the multi-factor user authentication framework using asymmetric key in accordance with one or more embodiments. The system 200 includes a host device 202 that is the host device 102 and that includes the user agent 104, the gesture system 106, and the authentication system 108. Thus, FIG. 2 illustrates an example in which the user agent 104, 104, the gesture system 106, and the authentication system 108 are all implemented in the same device.

The host device 202 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 2 the host device 202 can be implemented as a television client device 204, a computer 206, and/or a gaming system 208 that is connected to a display device 210 to display media content. Alternatively, the host device 202 may be any type of portable computer, mobile phone, or portable device 212 that includes an integrated display 214. The host device 202 may also be configured as a wearable device 216 that is designed to be worn by, attached to, carried by, or otherwise transported by a user. Examples of wearable devices 216 depicted in FIG. 2 include glasses, a smart band or watch, and a pod device such as clip-on fitness device, media player, or tracker. Other examples of wearable devices 216 include but are not limited to badges, a key fob, an access card, a ring, an article of clothing, a glove, or a bracelet, to name a few examples. The host device 202 can be implemented with various components, such as one or more processors and memory devices, as well as with any combination of differing components.

Figure 3:
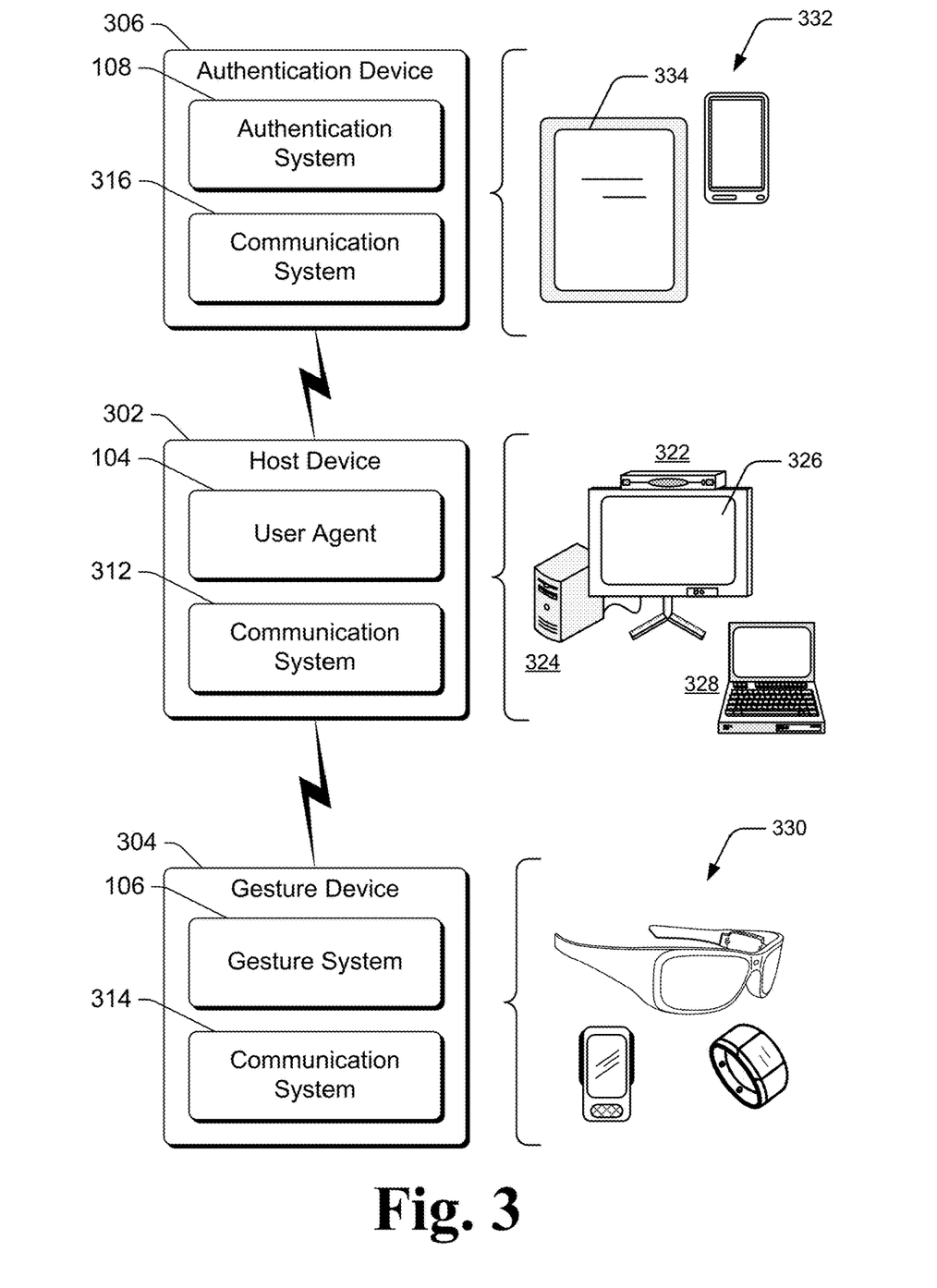
FIG. 3 illustrates another example system implementing the multi-factor user authentication framework using asymmetric key in accordance with one or more embodiments.

FIG. 3 illustrates another example system 300 implementing the multi-factor user authentication framework using asymmetric key in accordance with one or more embodiments. Contrary to the system 200 of FIG. 2, in the system 300 the user agent 104, the gesture system 106, and the authentication system 108 are each implemented in different devices. The system 300 includes a host device 302 that is the host device 102 and that includes the user agent 104, a gesture device 304 that includes the gesture system 106, and an authentication device 306 that includes the authentication system 108. The host device 302, gesture device 304, and authentication device 306 each also includes a communication system 312, 314, and 316, respectively. The communications systems 312, 314, and 316 each support one or more of a variety of different types of communication mechanisms as discussed above.

The host device 302 can be embodied as any suitable computing system and/or device. For example, as shown in FIG. 3 the host device 302 can be implemented as a television client device 322 and/or a computer 324 that is connected to a display device 326 to display media content, or a portable computer 328.

The gesture device 304 can be embodied as any suitable computing system and/or device. For example, as shown in FIG. 3 the gesture device 304 can be implemented as a wearable device 330 that is designed to be worn by, attached to, carried by, or otherwise transported by a user. Examples of wearable devices 330 depicted in FIG. 3 include glasses, a smart band or watch, and a pod device such as clip-on fitness device, media player, or tracker. Other examples of wearable devices 330 include but are not limited to badges, a key fob, an access card, a ring, an article of clothing, a glove, or a bracelet, to name a few examples.

The authentication device 306 can be embodied as any suitable computing system and/or device. For example, as shown in FIG. 3 the authentication device 306 can be implemented as any type of portable computer, mobile phone, or portable device 332 that includes an integrated display 334.

Although examples of implementing the user agent 104, the gesture system 106 and the authentication system 108 in a single device as well as across three different devices is discussed in FIGS. 2 and 3, it should be noted that the user agent 104, the gesture system 106, and the authentication system 108 can be implemented across any number of devices. For example, the user agent 104 and the gesture system 106 may be implemented in one device, and the authentication system 108 implemented in a separate device. By way of another example, the gesture system 106 and the authentication system 108 may be implemented in one device and the user agent 104 implemented in a separate device. By way of yet another example, one or more of the user agent 104, the gesture system 106, and the authentication system 108 may be separated across and implemented by multiple devices.

Returning to FIG. 1, communications between different ones of the host device, user agent, gesture system, and authentication system are protected against spoofing and tampering regardless of how many devices are used to implement the host device, user agent, gesture system, and authentication system. This protection against spoofing and tampering can be implemented in any of a variety of different manners. In one or more embodiments, in situations in which the communication is passed from one device to another, the information being communicated can be encrypted, digitally signed, passed via a dedicated wire (e.g., a communication channel used only for that communication and otherwise not available to other devices), and so forth. In situations in which the communication is passed within the same device (e.g., between two processes), the information being communicated can be encrypted, digitally signed, and so forth. Alternatively, the communication may remain within a secure processing area of the device (e.g., a trusted zone or virtual machine may be established that includes processes implementing the gesture system 106 and the authentication system 108 but no other processes), in which case encryption, digital signatures, and so forth need not be used.

The user agent 104 includes an I/O system 112 and an authentication handler 114. The I/O system 112 provides a user interface (UI) allowing inputs to be received from a user of the system 100 and outputs to be displayed or otherwise presented to a user of the system 100. The I/O system 112 also provides support to allow communication with other devices or services to which a user desires to authenticate himself or herself.

The user agent 104 displays or otherwise presents a user interface with which the user of the system 100 interacts. Thus, the user interface displayed or otherwise presented requesting that the user authenticate himself or herself, that the user enter a PIN or other biometric information, etc. is provided by the user agent 104. Other programs, plug-ins, remote services can invoke the user agent 104 to request that user authentication be performed, but the user interface is displayed or otherwise presented by the user agent 104 not the other program, plug-in, or remote service. Accordingly, a consistent user experience is maintained across the various programs, plug-ins, remote services and so forth.

In one or more embodiments, the user agent 104 is invoked when authentication of a user is desired. In one or more embodiments, the user agent 104 is implemented in an operating system of the device implementing the user agent 104. Additionally or alternatively, the user agent 104 can be implemented in other parts of the device, such as in a security process or other trusted program running on the device that implements the user agent 104. The user agent 104 can be accessed by various other programs, plug-ins, remote services or devices, and so forth. For example, the user agent 104 can expose one or more application programming interface (API) methods that can be invoked by other programs, plug-ins, remote services or devices, and so forth. The I/O system 112 used by these various other programs, plug-ins, remote services or devices, and so forth is thus the same, providing a consistent authentication experience to the user regardless of whether the user is authenticating himself or herself to such a program, plug-in, remote service or device, and so forth.

In one or more embodiments, the user agent 104 exposes a basic set of API methods that allows a program, plug-in, or remote service to create user credentials and/or request authentication of a user, and that allow proof of knowledge of a private key (and optionally proof of a gesture obtained by the gesture system 106) to be obtained from the authentication system 108. The system 100 is agnostic as to the protocols used to communicate with any remote service. For example, a program running on the same device as the user agent 104 can communicate with a remote service using any protocol desired by the program and the remote service, but still leverage the user authentication provided by the system 100.

In the system 100, the user agent 104 is also illustrated as including the authentication handler 114. Alternatively, the authentication handler 114 can be implemented separately from the user agent, and can optionally be implemented on a separate device from the user agent 104.

The authentication handler 114 communicates with the authentication system 108 to obtain the appropriate information or data that authenticates the user, and provides an indication of the result of that authentication to the I/O system 112. The I/O system 112 can then provide an indication of the result of the authentication to the user or other device, component, or service.

As discussed above, the multi-factor authentication includes a user credential. The authentication system 108 includes a user credential store 116 that stores one or more user credentials 118. In one or more embodiments, the user credential is an asymmetric key (e.g., the private key of a public/private key pair), which can be used to prove that the authentication system 108 has knowledge of and access to the asymmetric key. Although the private key of a public/private key pair is used to prove that the authentication system 108 has knowledge of and access to the asymmetric key, the user credentials 118 oftentimes include both the public key and the private key of the public/private key pair.

In one or more embodiments, the user credentials include at least one public/private key pair that is bound to the authentication system 108. The public/private key pair being bound to the authentication system 108 refers to the private key of the public/private key pair being known or accessible to the authentication system 108 but not to other systems or devices. Thus, if knowledge of the private key can be communicated to an entity, that entity knows that the communication came from the authentication system 108. The public/private key pair can be bound to the authentication system 108 in various manners, such as by being stored on the authentication system 108 at the time of creation of the authentication system 108 (e.g., at the time the device including the authentication system 108 is built), and the creator maintaining no record of the private key so that only the authentication system 108 has knowledge of the private key.

Additionally or alternatively, a public/private key pair that is bound to the authentication system 108 can be bound to the authentication system 108 in other manners. For example, a remote service over the Internet may communicate with the authentication system 108 via the user agent 104 and using a communication protocol that is known to and trusted by the remote service. E.g., the user agent 104 may be trusted by the remote service, and the remote service may communicate a public/private key pair to the user agent 104 for storage in the user credential store 116.

The authentication system 108 maintains the user credentials 118 in a secure manner, allowing the user credentials 118 to be accessed by an encryption/decryption module 120 of the authentication system 108, but preventing the user credentials 118 from being accessed by other modules or programs of the system 100. In one or more embodiments, the user credential store is implemented as part of a Trusted Platform Module (TPM), such as a TPM in accordance with the Trusted Platform Module Library Specification, Family "2.0", Revision 01.16 (Oct. 30, 2014). Additionally or alternatively, the user credential store 116 can be implemented in other secure manners, such as being encrypted by an operating system or other trusted program running on the device implementing the authentication system 108.

The encryption/decryption module 120 encrypts and decrypts data as appropriate based on the user credentials 118, including generating a digital signature based on a private key that is included as at least part of the user credentials 118. A digital signature on particular content or data (e.g., a digital certificate that identifies the authentication system 108, a nonce or other challenge data presented by another entity (e.g., the user agent 104 or a remote service), a gesture received from the gesture system 106, etc.) is used to prove that the authentication system 108 has knowledge of or access to the user credentials 118. The encryption/decryption module 120 digitally signs the particular content or data using a private key (the user credentials 118) of a public/private key pair, and the digitally signed content or data is provided to the requester (e.g., the user agent 104, a remote service, etc.). This digitally signed content or data is an assertion of proof by the authentication system 108 that the authentication system 108 has knowledge of the private key. The requester can then use the public key of the public/private key pair to verify that the encryption/decryption module 120 indeed generated the digital signature (and thus that the authentication system 108 has knowledge of or access to the private key).

One or more additional digital signatures of other trusted entities can be used to improve privacy for the authentication system 108. By way of example, an operating system or other trusted program running on the device implementing the authentication system 108 (or on another device, such as a device implementing the user agent 104), can verify that the encryption/decryption module 120 indeed generated the digital signature, and then the operating system or other trusted program can digitally sign data or other content indicating that the authentication system 108 has proven that the authentication system 108 has knowledge of or access to the user credentials 118. The requester thus receives the digital signature from an operating system or other program that the requester trusts (e.g., any of the operating systems from the Windows® family of operating systems), and need not use (or even have knowledge of) the public key corresponding to the private key in the user credentials 118.

As discussed above, the multi-factor authentication also includes a gesture. The gesture system 106 includes an I/O system 122 that detects information regarding whether a particular user is present. The information regarding the particular user being present refers to the particular user being present at the host device 102 and/or at the device implementing the gesture system 106. The I/O system 122 detects information, which is also referred to herein as a gesture, regarding the user. The gesture can be any information that can be used as evidence of the particular user. The goal of the gesture is to uniquely identify a particular user (at least uniquely within the system 100), allowing the user to be distinguished from other users of the system 100.

In one or more embodiments, the gesture comprises user input of secret information that only the user is expected to know. This secret information can be a PIN, password, pattern traced by a finger or other object on a touchscreen device, audible input, or other data.

Additionally or alternatively, the gesture comprises biometric information of the user, which refers to measurable characteristics of the user. The biometric information can be, for example, a fingerprint, facial characteristics (for face recognition), eye characteristics (for eye recognition), heart rate information, skin temperature information, and so forth.

Additionally or alternatively, the gesture comprises geographic location information for the gesture system 106 that is associated with the particular user. The geographic location of the gesture system 106 can be determined in various manners, such as using a global positioning system (GPS), determining which wireless (e.g., Wi-Fi) networks are accessible and the strength of the signals for those wireless networks, and so forth. For example, a GPS location indicating that the gesture system 106 is in the same (e.g., within a threshold distance, such as 100 meters) location as the host device 102 can be used as an indication that the gesture system 106 is present at the host device 102. By way of another example, an indication that the gesture system 106 can detect (or is logged into) the same wireless network (e.g., home Wi-Fi network) as the host device 102 can be used as an indication that the gesture system 106 is present at the host device 102. By way of yet another example, a GPS location indicating that the gesture system 106 is at (or within a threshold distance of, such as 100 meters) the user's home or office (e.g., a known location of the user's home or office) can be used as an indication that the gesture system 106 is present at the host device 102.

The gesture system 106 provides the gesture to the authentication system 108. The manner in which the gesture is provided to the authentication system 108 can vary based on the type of the gesture (e.g., the secret information input by the user can be provided to the authentication system 108, the biometric information of the user can be provided to the authentication system 108, the GPS location of the gesture system 106 can be provided to the authentication system 108, etc.). The authentication system 108 includes a gesture verification system 124 that verifies the gesture. The gesture verification system 124 includes a gesture verification store 126 that includes gesture verification data 128 for the user. The verification system 124 compares the gesture received from the gesture system 106 to the gesture verification data 128, and determines whether the gesture received from the gesture system 106 matches (e.g., is the same as) the gesture verification data 128. For example, a PIN received from the gesture system 106 can be compared to a known PIN for the user in the gesture verification data 128, and the user is verified as being present at the system 100 (e.g., at the user agent 104) if the PIN received from the gesture system 106 is the same as the PIN for the user in the gesture verification data 128. By way of another example, data describing characteristics of an eye scanned by the gesture system 106 can be compared to known data regarding eye characteristics for the user in the gesture verification data 128, and the user is verified as being present at the system 100 (e.g., at the user agent 104) if the data describing characteristics of an eye scanned by the gesture system 106 matches (e.g., a threshold confidence that the data is the same as) the data regarding eye characteristics for the user in the gesture verification data 128.

The authentication system 108, in response to determining that the user is present at the system 100, generates a cryptographic proof that combines proof of knowledge of the private key and optionally proof of the gesture received from the gesture system 106. The cryptographic proof includes an indication that the private key has been verified by the authentication system 108 (e.g., by explicitly including proof of the gesture, by only generating the cryptographic proof if the gesture is verified, etc.). The cryptographic proof generated by the authentication system 108 can be, for example, a statement (digitally signed using the private key) that the user is authenticated. Along with, or as part of, the statement (and thus digitally signed using the private key) the authentication system 108 can include proof of the gesture, such as an indication of what type of gesture (e.g., PIN, face, fingerprint, etc.) was verified by the authentication system 108.

The cryptographic proof generated by the authentication system 108 is the information or data that authenticates the user, and the authentication system 108 provides the cryptographic proof to the authentication handler 114. An indication of the result of the authentication (e.g., the cryptographic proof itself, an indication that no cryptographic proof was received from the authentication system 108, etc.) is provided to the I/O system 112, which provides an indication of the result of the authentication to the user or other device, component, or service that is requesting the authentication of the user. If the cryptographic proof itself is provided as the result of the authentication, then the other device, component, or service that receives the result can verify the cryptographic proof using the public key (of the public/private key pair that includes the private key used to generate the cryptographic proof).

Thus, the gesture, from the perspective of the requester (the device, component, or service requesting the authentication of the user) can be explicit (e.g., when the proof of gesture is included with the cryptographic proof). The gesture, from the perspective of the requester, can alternatively be implicit (e.g., when no proof of gesture is included with the cryptographic proof, but the requester knows by some out of band means (e.g., by trusting in the provisioning mechanism of the public/private key pair) that the cryptographic proof could not have been generated without such a gesture).

Figure 4:
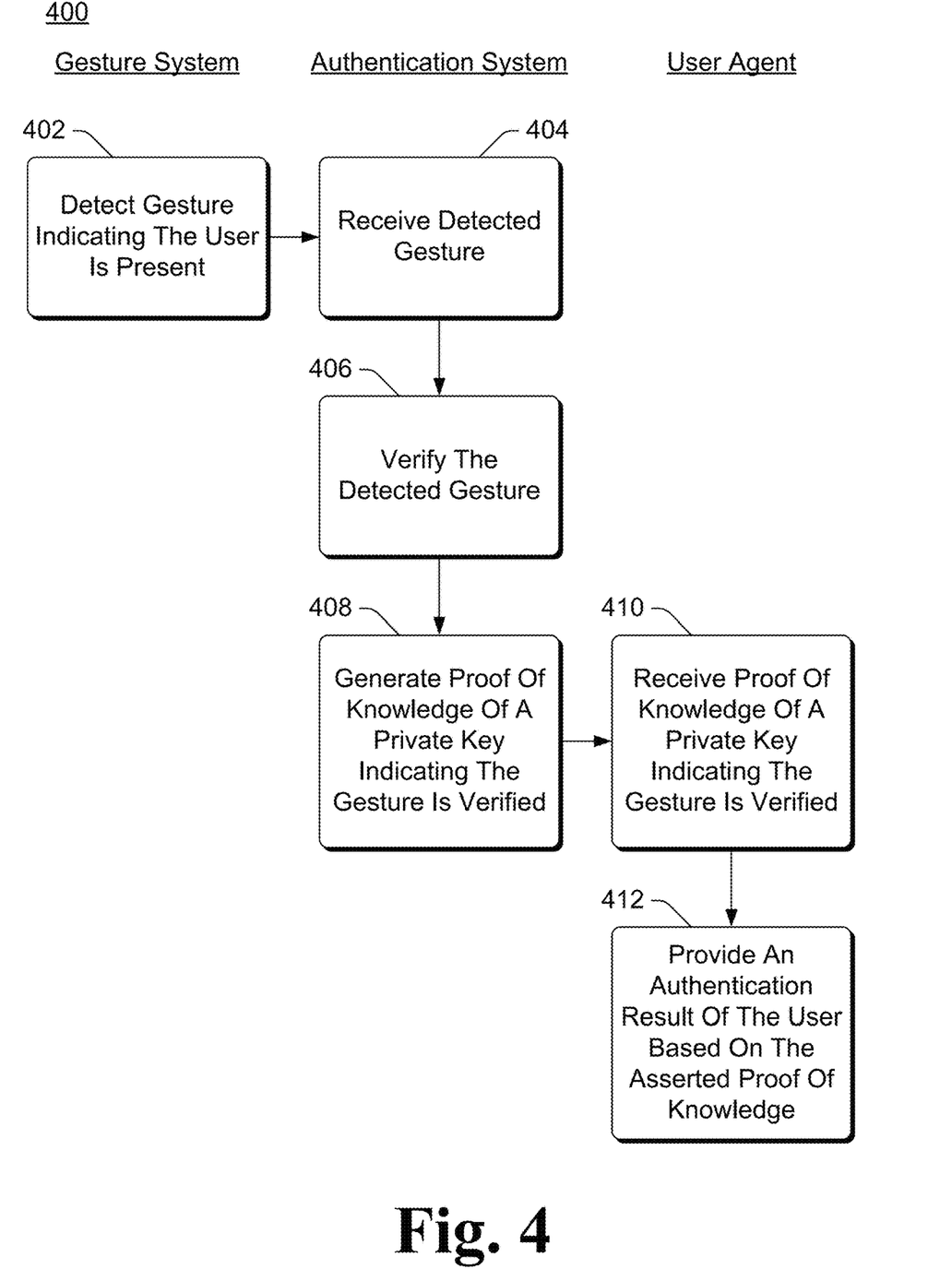
FIG. 4 is a flowchart illustrating an example process for implementing the multi-factor user authentication framework using asymmetric key in accordance with one or more embodiments.

FIG. 4 is a flowchart illustrating an example process 400 for implementing the multi-factor user authentication framework using asymmetric key in accordance with one or more embodiments. Process 400 is carried out by one or more devices of a system, such as the system 100 of FIG. 1, the system 200 of FIG. 2, or the system 300 of FIG. 3, and can be implemented in software, firmware, hardware, or combinations thereof. Acts on the left-hand side of process 400 are performed by a gesture system (e.g., the gesture system 106), acts in the middle of process 400 are performed by an authentication system (e.g., the authentication system 108), and acts on the right-hand side of process 400 are performed by a user agent (e.g., the user agent 104). Process 400 is shown as a set of acts and is not limited to the order shown for performing the operations of the various acts. Process 400 is an example process for implementing the multi-factor user authentication framework using asymmetric key; additional discussions of implementing the multi-factor user authentication framework using asymmetric key are included herein with reference to different figures.

In process 400, a gesture indicating that the user is present is detected by a gesture system (act 402). The gesture can be any information that can be used as evidence that the user is present as discussed above.

The gesture detected by the gesture system is communicated to and received by the authentication system (act 404). The authentication system verifies the gesture (act 406). This verification is performed based on verification data for the user that is known to the authentication system, and the verification process varies based on the type of the gesture.

Proof of knowledge of a private key is generated and provided to the user agent (act 408). The proof of knowledge is, for example, digitally signed data or other content. The generated proof of knowledge of the private key includes an indication that the gesture detected by the gesture system is verified. If the gesture detected by the gesture system is not verified, then no proof of knowledge is provided to the user agent in act 408.

The proof of knowledge of the private key, including the indication that the gesture is verified, is received by the user agent (act 410). An authentication result indicating that the proof of knowledge is received is provided (act 412). The authentication result can be provided to another program, device, or service as discussed above.

Returning to FIG. 1, the techniques described herein can provide an initial authentication of a user (e.g., when the user initially accesses a program or service), as well as continued verification of the user. For example, the gesture verification system 124 can continue to obtain, at regular or irregular intervals (e.g., approximately every 15 minutes), detected gestures from the gesture system 106 after the user has been authenticated. The gesture verification system 124 can request that a gesture be detected from the gesture system 106 at particular intervals, and/or the gesture system 106 can be configured to automatically detect a gesture and particular intervals and communicate the detected gestures to the gesture verification system 124. This allows for an on-going or continued verification that the user is present at the user agent 104. In response to a detected gesture no longer being received from the gesture system 106, the gesture verification system 124 can determine that the user is no longer authenticated and appropriate action can be taken. For example, a remote service or device can be notified that the user is no longer authenticated, or the user can be automatically logged off a computing device or logged out of a program.

By way of another example, the gesture verification system 124 can obtain detected gestures from the gesture system 106 in response to different events. These events can include, for example, data accesses (e.g., requests to open a file), resource accesses (e.g., requests to print a document or access a particular storage device), requested launching of programs, and so forth. The detected gestured obtained in response to such an event is verified, and the event is allowed to continue or be performed in response to the user being authenticated for the event (e.g., the data access, resource access, or program launch is allowed to be performed only in response to the user being authenticated for the event).

The techniques discussed herein also allow different authentication parameters (e.g., characteristics of the gesture, number of gestures (e.g., factors) needed for authentication, etc.) to be specified by different entities (e.g., remote services, enterprise management services, etc.) and enforced by the system 100, all while maintaining a consistent user experience. For example, an enterprise management service can indicate that a PIN is to have certain characteristics (e.g., be a particular length), and this can be included in the gesture verification data 128 so that the user is authenticated only if the user has a PIN with the requisite characteristics.

In the discussions herein, reference is made to two-factor authentication, the two factors including a gesture and knowledge of the user credentials. It should be noted, however, that the framework discussed herein supports additional factors. Such additional factors can be specified, for example, in the gesture verification system 124 and the user is authenticated by the gesture verification system 124 only if these additional factors are satisfied. For example, two or more different gestures may be required from the gesture system 106 (e.g., a PIN, and the device implementing the gesture system 106 being at a same geographic location as the device implementing the user agent 104 (or at a geographic location that is the user's home)). By way of another example, the different gestures required from the gesture system 106 may include the user showing his or her face, having his or her fingerprint scanned, typing in a PIN, saying a secret word, and the GPS location of the device having particular coordinates.

In one or more embodiments, the system 100 also supports recovery of gestures forgotten by the user. Some gestures (e.g., biometric information) may not be forgettable, but some gestures (passwords, PINs) can be forgettable. A copy of the gesture is stored protected by another password or account associated with the user, such as an online service account password, an enterprise domain password, and so forth. This password is, for example, a password accessible to the user agent 104. The protection can take various forms, such as encryption based on the password, storage of the protected gesture in an area that is accessible only if the password is provided, and so forth. If the user forgets his or her gesture, the user can request recovery of the gesture, in response to which the user agent 104 (or alternatively the gesture system 106 or authentication system 108) prompts the user to input the other password (the password for the other account), verifies that the user inputs the proper password, and in response to the user inputting the proper password decrypts and/or obtains the gesture and notifies the user of the gesture (and/or allows the user to reset the gesture).

In one or more embodiments, the techniques discussed herein also provide continuous authentication of the user across multiple devices. A record of the authentication of the user can be maintained by the user agent 104 (or alternatively one or both of the gesture system 106 or the authentication system 108), and the user can be automatically authenticated to other devices that are at the same geographic location as the host device 102. For example, if the host device 102 is a desktop PC, and the user has authenticated himself or herself to the user agent 104 on the desktop PC, and the user then brings a tablet computer into the same room as the desktop PC, the user agent 104 on the desktop PC can communicate an indication to the tablet computer (e.g., to another instance of the user agent running on the tablet computer) that the user has been authenticated. The user can thus be automatically logged into the tablet computer without needing to re-input the gesture.

It should also be noted that the techniques discussed herein can be used to provide access to various different types of devices or components, and are not limited to logging on to programs or devices. For example, the user can be authenticated by the authentication system 108, and the user agent 104 (e.g., through the I/O system 112 or another program or plug-in running on the computing device implementing the user agent 104) an indication of the result of the authentication (received from the authentication system 108) to another device or component. Such a device or component may be a light switch (e.g., to turn on a light), a door lock (e.g., to allow the user to open the door), a thermostat (e.g., to allow the user to change the temperature), a stove (e.g., to allow the user to turn on a burner or oven), and so forth.

It should also be noted that, as discussed above, the user agent 104 can be implemented in an operating system of a computing device. Implementing the user agent 104 in the operating system of the computing device allows the setup and configuration pages or techniques used by that operating system to be leveraged to change the gesture that is used, to recover a forgotten gesture, and so forth. For example, to change the gesture for a particular gesture system, the user can access the setup or configuration page of the operating system. The user agent 104, being part of the operating system, prompts the user to input the gesture he or she desires, and saves the gesture as gesture verification data 126. This further maintains the consistent user experience discussed above due to the user accessing the setup and configuration pages he or she is accustomed to as part of the operating system.

The techniques discussed herein support various usage scenarios. By way of example, the user agent 104 may be implemented on a host device 102 that is a desktop PC and the gesture system 106 and authentication system 108 may both be implemented on a smartphone. The user logs into his or her desktop PC by inputting a PIN to the phone, which provides information or data that authenticates the user to the desktop PC.

By way of another example, the user agent 104 and the authentication system 108 may be implemented on a tablet computer, and the gesture system 106 may be implemented on a smart band that is typically worn by the user. A remote service that is a banking service provides a program or plug-in, which is run on the same tablet computer as the user agent 104. The banking service uses a procedure that it trusts to establish user credentials 118 for the banking service on the tablet computer. Once those user credentials are stored in the user credential store 116, and a gesture to use to verify the user is stored in the gesture verification store 126, the user can be authenticated for use with the banking service. E.g., whenever the authentication system 108 verifies that the smart band is in the same geographic location as the tablet computer, the information or data that authenticates the user is provided to the user agent, and the user agent 104 communicates an indication to the banking program or plug-in on the tablet computer that the user is authorized to use the banking service.

It should also be noted that the techniques discussed herein provide an extensible multi-factor user authentication framework. The various components (the user agent, gesture system, and authentication system) can be implemented on various different devices as desired by the developer using the framework. Furthermore, various programs, plug-ins, remote services, and so forth can leverage the framework discussed herein, allowing the consistent user experience for user authentication across those various programs, plug-ins, remote services, and so forth.

This extensibility allows developers to design and implement their own gesture systems and authentication systems, and communicate with the user agent via the API methods or other communication technique exposed by the user agent. These different gesture systems can support different types of gestures, and these authentication systems can be implemented in various manners and provide various different types of secure storage of user credentials. However, the user agent is able to communicate with and operate in conjunction with these various different gesture systems and authentication systems.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
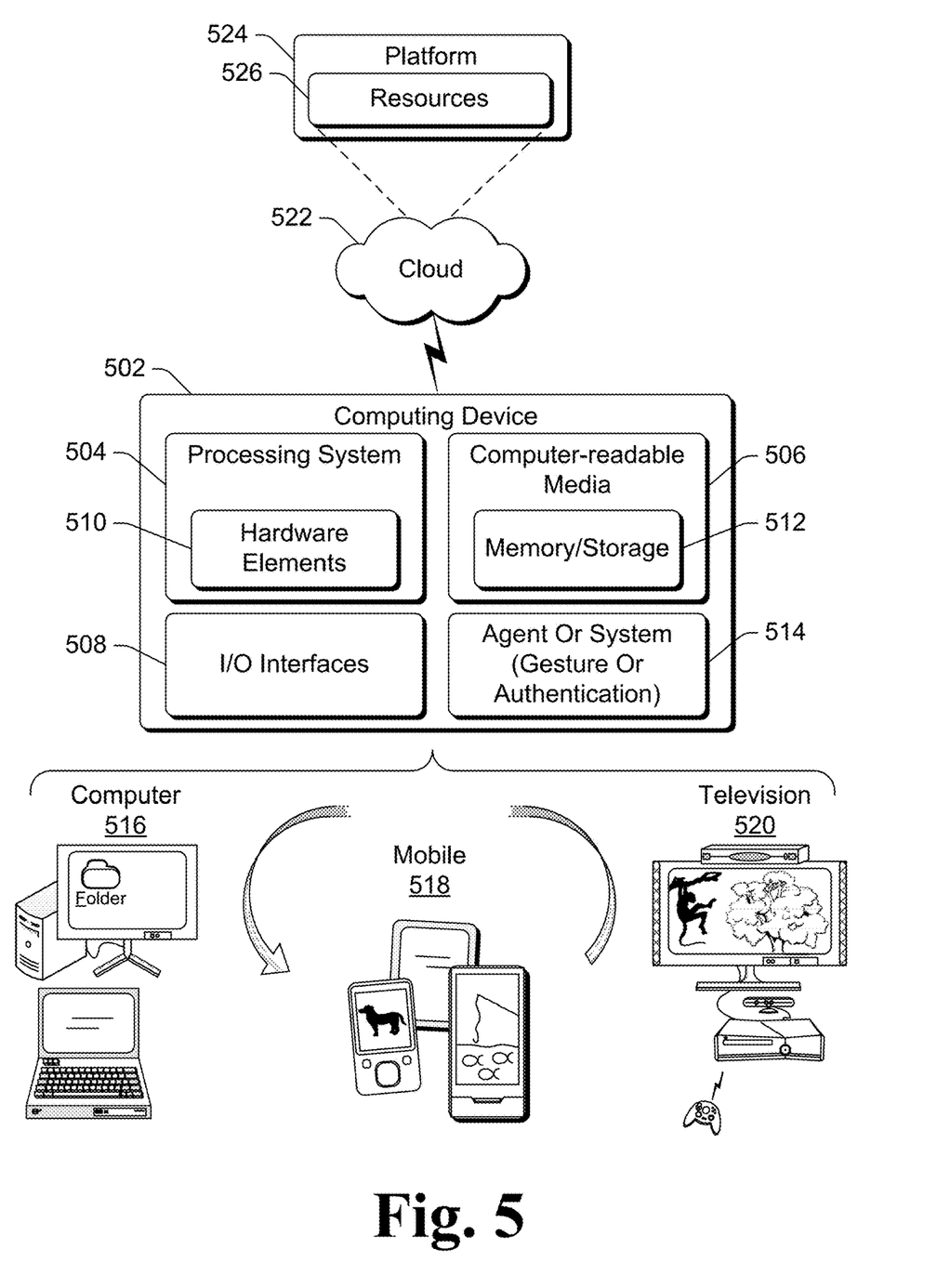
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes an agent or system 514. The agent or system 514 is a user agent, a gesture system, an authentication system, or some combination thereof as discussed above. The agent or system 514 can be, for example, the user agent 104 of FIGS. 1-3, the gesture system 106 of FIGS. 1-3, the authentication system 108 of FIGS. 1-3, or some combination thereof.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A computing device comprising: one or more processors; and a computer-readable storage medium having stored thereon multiple instructions that, responsive to execution by the one or more processors, cause the one or more processors to: receive, from an authentication system, proof of knowledge of a private key of a public/private key pair, the proof of knowledge of the private key including an indication that a gesture of a user detected by a gesture system has been verified by the authentication system, the gesture indicating that the user is present at the computing device; and provide an authentication result of the user based at least on the proof of knowledge of the private key, to a requester of the authentication result.

Alternatively or in addition to any of the above described computing devices, any one or combination of: the gesture comprising a user input of a personal identification number (PIN); the gesture comprising biometric information of the user; the gesture comprising the geographic location of a gesture device that implements the gesture system, the gesture indicating that the user is present at the computing device by indicating that the gesture device is in a same geographic location as the computing device; the gesture indicating that the gesture device is in the same geographic location as the computing device in response to the gesture device and the computing device being logged into a same Wi-Fi network; the multiple instructions further causing the one or more processors to provide a consistent user experience regardless of whether the requester is a program running on the computing device or a remote service being accessed by the computing device; the multiple instructions further causing the one or more processors to repeatedly receive the proof of knowledge based on additional gestures of the user received by the authentication system at particular intervals for continued authentication of the user; the proof of knowledge of the private key including proof that the public/private key pair is bound to an authentication device implementing the authentication system; the multiple instructions further causing the one or more processors to store a copy of the gesture, protected by a password associated with the user, to permit recovery of the gesture; the authentication system enforcing gesture parameters specified by an enterprise management service; the multiple instructions further causing the one or more processors to:

receive, from the authentication system, proof of knowledge of the private key including an indication that an additional gesture of the user is detected by the gesture system in response to a request to launch a program; and launch the requested program only if the proof of knowledge of the private key including the indication that the additional gesture of the user is detected by the gesture system.

A method in a computing device, the method comprising: receiving, from an authentication system, proof of knowledge of a private key of a public/private key pair, the proof of knowledge of the private key including an indication that a gesture of a user detected by a gesture system has been verified by the authentication system, the gesture indicating that the user is present at the computing device; and providing an authentication result of the user based at least on the proof of knowledge of the private key, to a requester of the authentication result.

Alternatively or in addition to any of the above described methods, any one or combination of: the gesture comprising a user input of a personal identification number (PIN); the gesture comprising biometric information of the user; the gesture comprising the geographic location of a gesture device that implements the gesture system, the gesture indicating that the user is present at the computing device by indicating that the gesture device is in a same geographic location as the computing device; the geographic location of the gesture device comprising a geographic location obtained from a global positioning system (GPS) of the gesture device; the method further comprising providing a consistent user experience for authentication of the user regardless of whether authentication of the user is requested by a program running on the computing device or a remote service being accessed by the computing device; the proof of knowledge of the private key including proof that the public/private key pair is bound to an authentication device implementing the authentication system is received.

A method implemented in an authentication system, the method comprising: receiving a gesture detected by a gesture system, the gesture indicating that a user is present at a host device; verifying the gesture; generating, in response to the gesture being verified, proof of knowledge of a private key of a public/private key pair, the proof of knowledge of the private key including an indication that the gesture has been verified by the authentication system; and communicating the proof of knowledge to a user agent of the host device.

Alternatively or in addition to any of the above described methods, any one or combination of: the authentication system being implemented in an additional device separate from the host device; the gesture comprising a user input of a personal identification number (PIN); the gesture comprising biometric information of the user; the gesture comprising the geographic location of a gesture device that implements the gesture system, the gesture indicating that the user is present at the host device by indicating that the gesture device is in a same geographic location as the host device; the gesture indicating that the gesture device is in the same geographic location as the host device in response to the gesture device and the host device being logged into a same Wi-Fi network; the method further comprising providing a consistent user experience regardless of whether a requester of the authentication result is a program running on the host device or a remote service being accessed by the host device; the method further comprising repeatedly receiving additional gestures detected by the gesture system, verifying the additional gestures, and generating, in response to the additional gestures being verified, additional proofs of knowledge of the private key at particular intervals for continued authentication of the user; the proof of knowledge of the private key including proof that the public/private key pair is bound to an authentication device implementing the authentication system; further comprising storing a copy of the gesture, protected by a password associated with the user, to permit recovery of the gesture; further comprising enforcing gesture parameters specified by an enterprise management service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An authentication system comprising:
a gesture verification system, executing on one or more processor circuits, configured to receive a gesture detected by a gesture system, the gesture indicating that a user is present at a host device, and to verify the gesture; and
a digital signature generator, executing on the one or more processor circuits, configured to
generate, in response to the gesture being verified, a statement digitally signed using a private key of a public/private key pair, the digitally signed statement indicating both
that the authentication system has knowledge of the private key and
that the gesture has been verified, and communicate the statement to a user agent of the host device.

2. The authentication system as recited in claim 1, the gesture verification system being further configured to enforce gesture parameters specified by an enterprise management service.

3. The authentication system as recited in claim 1, the gesture comprising one or both of a user input of a personal identification number (PIN) and biometric information of the user.

4. The authentication system as recited in claim 1, the public/private key pair being bound to an authentication device implementing the authentication system.

5. A computing device comprising:
one or more processor circuits; and
one or more computer-readable storage devices having stored thereon instructions that, responsive to execution by the one or more processor circuits, cause the one or more processor circuits to:
receive, from an authentication system, a digitally signed statement comprising proof of a user gesture detected by a gesture system and indicating that the authentication system has knowledge of a private key of a public/private key pair, the proof indicating that the user gesture has been verified by the authentication system, the user gesture indicating presence of a user at the computing device;
verify the digitally signed statement using a public key of the public/private key pair; and
based at least on the verification of the digitally signed statement, provide, to a requester, an authentication result of the user.

6. The computing device as recited in claim 5, the instructions further causing the one or more processor circuits to provide a consistent user experience regardless of whether the requester is a program running on the computing device or a remote service being accessed by the computing device.

7. The computing device as recited in claim 5, the instructions further causing the one or more processor circuits to store a copy of the user gesture, protected by a password associated with the user, to permit recovery of the user gesture.

8. The computing device as recited in claim 5, the user gesture comprising one or both of a user input of a personal identification number (PIN) and biometric information of the user.

9. A method performed by a computing device, the method comprising:
   receiving, by the computing device, from an authentication system, a digitally signed statement comprising proof of a user gesture detected by a gesture system, the proof indicating that the user gesture has been verified by the authentication system and indicating that the authentication system has knowledge of a private key of a public/private key pair, the user gesture indicating presence of a user at the computing device;
   verifying the digitally signed statement using a public key of the public/private key pair; and
   based at least on the verification of the digitally signed statement, providing, by the computing device, to a requester, an authentication result of the user.

10. The method as recited in claim 9, further comprising repeatedly receiving digitally signed statements based on additional user gestures received by the authentication system at particular intervals for continued authentication of the user.

11. The method as recited in claim 9, the user gesture indicating presence of the user at the computing device by indicating that a gesture device that implements the gesture system that detected the user gesture is in a same geographic location as the computing device.

12. The method as recited in claim 11, the user gesture indicating that the gesture device is in the same geographic location as the computing device based on the gesture device and the computing device being logged into a same Wi-Fi network.

13. An authentication system comprising:
   a gesture verification system, executing on one or more processor circuits, configured to receive a user gesture, detected by a gesture system, indicating presence of a user at a computing device, and to verify the user gesture; and
   a digital signature generator, executing on the one or more processor circuits, configured to
      use a private key of a public/private key pair, to digitally sign a statement comprising proof of the user gesture that was detected by the gesture system, the proof indicating that the user gesture has been verified by the authentication system and indicating that the authentication system has knowledge of the private key, and
      provide to the computing device the digitally signed statement.

14. The authentication system as recited in claim 13, the public/private key pair being bound to an authentication device implementing the authentication system.

15. The authentication system as recited in claim 13, the gesture verification system being further configured to enforce gesture parameters specified by an enterprise management service.

16. The authentication system as recited in claim 13, the authentication system being implemented in an additional device separate from the computing device.

17. A method implemented by an authentication system executing on a first computing device, the method comprising:
   receiving a user gesture, detected by a gesture system, indicating presence of a user at a second computing device;
   verifying the user gesture;
   using a private key of a public/private key pair, to digitally sign a statement comprising proof of the user gesture that was detected at the gesture system, the proof indicating that the user gesture has been verified by the authentication system and indicating that the authentication system has knowledge of the private key; and
   providing to the second computing device the statement.

18. The method as recited in claim 17, the user gesture comprising one or both of a user input of a personal identification number (PIN) and biometric information of the user.

19. The method as recited in claim 17, the user gesture indicating presence of the user at the second computing device by indicating that a gesture device that implements the gesture system is in a same geographic location as the second computing device.

20. The method as recited in claim 17, further comprising repeatedly performing the receiving, verifying, using, and providing on additional user gestures of the user received by the authentication system at particular intervals for continued authentication of the user.

21. The computing device as recited in claim 5, wherein the proof further indicates a type of the user gesture that was verified by the authentication system.

\* \* \* \* \*